United States Patent
Duncan et al.

(10) Patent No.: US 11,403,313 B2
(45) Date of Patent: Aug. 2, 2022

(54) DYNAMIC VISUALIZATION OF APPLICATION AND INFRASTRUCTURE COMPONENTS WITH LAYERS

(71) Applicant: JPMORGAN CHASE BANK, N.A., New York, NY (US)

(72) Inventors: Matthew E. Duncan, Dublin, OH (US); Robert S. Newnam, Wilmington, DE (US); Richard A. Hall, Marysville, OH (US); Eric Han Kai Chang, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 232 days.

(21) Appl. No.: 16/519,514

(22) Filed: Jul. 23, 2019

(65) Prior Publication Data

US 2020/0026701 A1 Jan. 23, 2020

Related U.S. Application Data

(60) Provisional application No. 62/702,025, filed on Jul. 23, 2018.

(51) Int. Cl.
*G06F 7/00* (2006.01)
*G06F 16/00* (2019.01)
(Continued)

(52) U.S. Cl.
CPC ........ *G06F 16/248* (2019.01); *G06F 16/2379* (2019.01)

(58) Field of Classification Search
None
See application file for complete search history.

(56) References Cited

U.S. PATENT DOCUMENTS

2012/0078680 A1\* 3/2012 Tharp .................... G06Q 50/06
705/7.28
2012/0226987 A1 9/2012 Wei et al.
(Continued)

OTHER PUBLICATIONS

International Search Report, dated Oct. 18, 2019, from corresponding International Application No. PCT/US2019/042978.
(Continued)

*Primary Examiner* — Tuan A Pham
(74) *Attorney, Agent, or Firm* — Greenberg Traurig LLP

(57) ABSTRACT

Systems and methods for providing dynamic visualization of application and infrastructure components are disclosed. In one embodiment, in an information processing apparatus comprising at least one computer processor, a system for providing dynamic visualization of application and infrastructure components may include: (1) receiving, at an interface and from a requestor, a request for information about an application or infrastructure; (2) querying one or more systems of record or a data cache containing data from the one or more systems of record for data about the application or infrastructure components within the infrastructure; (3) formatting the data received from the one or more systems of record or the data cache according to a data definition; (4) identifying relational links between the applications and the infrastructure components in the formatted data; and (5) graphically rendering the formatted data and relational links in a plurality of interactive levels.

19 Claims, 11 Drawing Sheets

(51) Int. Cl.
     *G06F 16/248*     (2019.01)
     *G06F 16/23*      (2019.01)

(56) References Cited

U.S. PATENT DOCUMENTS

| | | | |
|---|---|---|---|
| 2014/0006601 A1* | 1/2014 | Agarwal | G06Q 30/00 |
| | | | 709/224 |
| 2016/0127440 A1* | 5/2016 | Gordon | H04N 21/23439 |
| | | | 709/219 |
| 2016/0337186 A1* | 11/2016 | Dolinsky | H04L 41/0853 |
| 2016/0373313 A1* | 12/2016 | Giri | H04L 41/06 |
| 2017/0220633 A1* | 8/2017 | Porath | G06F 9/542 |

OTHER PUBLICATIONS

Written Opinion of the International Searching Authority, dated Oct. 18, 2019, from corresponding International Application No. PCT/US2019/042978.

* cited by examiner

DYNAMIC VISUALIZATION OF APPLICATION AND INFRASTRUCTURE COMPONENTS WITH LAYERS

RELATED APPLICATIONS

This application claims priority to, and the benefit of, U.S. Provisional Patent Application Ser. No. 62/702,025, filed Jul. 23, 2018, the disclosure of which is hereby incorporated, by reference, in its entirety.

1. FIELD OF THE INVENTION

The present disclosure generally relates to maintaining documentation for application and infrastructure component architecture, and more particularly to systems and methods for dynamic visualization of application and infrastructure components with layers to provide insight on application and infrastructure component architecture documented in systems of record.

2. DESCRIPTION OF THE RELATED ART

Businesses frequently rely on one or more systems of record for their applications and infrastructure components. The systems of record may have information on, for example, applications, the components of those applications, the roadmap and life cycle of those applications, etc., as well as similar information for application components. Other systems of record may have, for example, details about the infrastructure that support those applications, including for example networking. Applications and infrastructure components may change over time, but most documentation is maintained by a human and requires manual updates to capture the changes. As a result, the documentation over time diverges from the applications and infrastructure components. Maintaining documentation is costly and error-prone. The cost and complexity of maintenance scales with the number and size of the systems in place. There may be dozens of different systems of record that have information on thousands of applications. Documentation may be scattered among multiple different document repositories and systems. There is no currently no way to gather that information from disparate sources and visualize it in such a way that a user can understand where each application and infrastructure component exists in the business, what are they doing, and how are they connected.

These and other drawbacks exist with known systems and processes. Hence, there is a need for a system and method to assist a user in maintaining documentation for application and infrastructure component architecture and for visualizing the same.

SUMMARY OF THE INVENTION

Exemplary embodiments provide a system and method for dynamic visualization of application and infrastructure components with layers. According to one embodiment, a computer-implemented method for providing dynamic visualization of application and infrastructure components may include the steps of receiving from a user or API client a request for information about an application or infrastructure; querying one or more systems of record or a data cache containing data from one or more systems of record for data about application and infrastructure components within an infrastructure; formatting the data received from each system of record according to a data definition; identifying in the formatted data any relational links between the data sets, applications, and/or infrastructure components; transmitting to the user or API client the formatted data and relational links; and rendering the formatted data and relational links on a display. The step of rendering may further comprise organizing the data into multiple levels of detail and/or organizing the data into multiple layers that can be turned on or off by the user or API client.

In other embodiments, a computer-implemented system for providing dynamic visualization of application and infrastructure components may include a computer readable medium containing program instructions for executing a method for providing dynamic visualization of application and infrastructure components.

Exemplary embodiments may provide a number of advantages to a business or organization in need of an improved method to maintain and visualize documentation for application and infrastructure components within systems of record. Embodiments may support discoverability of insight through consolidation of information from systems of record combined with a navigable, leveled display view comprising toggle-able layers. These and other advantages will be described further in the detailed description below.

According to one embodiment, in an information processing apparatus comprising at least one computer processor, a method for providing dynamic visualization of application and infrastructure components may include: (1) receiving, at an interface and from a requestor, a request for information about an application or infrastructure; (2) querying one or more systems of record or a data cache containing data from the one or more systems of record for data about the application or infrastructure components within the infrastructure; (3) formatting the data received from the one or more systems of record or the data cache according to a data definition; (4) identifying relational links between the applications and the infrastructure components in the formatted data; and (5) graphically rendering the formatted data and relational links in a plurality of interactive levels.

In one embodiment, the method the requestor may include a user or an API client.

In one embodiment, the method may further include accessing data with entitlement restrictions in the one or more systems of record or the data cache using at least one credential for the user or the API client.

In one embodiment, the query may include at least of an application name, an application ID, an IP address, a server name, and a physical equipment location.

In one embodiment, the method may further include determining a type of property of the query using pattern matching.

In one embodiment, each of system of record or data cache may be associated with a plug-in, and the plug-in formats the data received from the respective one or more system of record or data cache.

In one embodiment, the method may further include periodically querying the one or more systems of record for information about a plurality of applications and a plurality of infrastructure components; and updating the data cache with results of the periodic query.

In one embodiment, the data may include at least one of metrics, status information, and connectivity information.

In one embodiment, the formatted data and relational links in a plurality of interactive levels may be graphically rendered with data retrieved from a drawing repository.

In one embodiment, the method may further include identifying the one or more systems of record or the data cache that hold data about the application or infrastructure components within the infrastructure. The identification may be based on at least one data definition in a data registry for each system of record.

According to another embodiment, a system for providing dynamic visualization of application and infrastructure components may include an interface configured to interface with a user or an API client; a dynamic visualization application executed by a server; a plurality of systems of record, each system of record comprising information about a plurality of applications or a plurality of infrastructure components; and a data cache comprising cached information about the plurality of applications or the plurality of infrastructure components. The interface may receive, from a requestor, a request for information about an application or infrastructure. The dynamic visualization application may query one or more of the systems of record or the data cache for data about the application or infrastructure components within the infrastructure, format the data received from the one or more systems of record or the data cache according to a data definition; identify relational links between the applications and the infrastructure components in the formatted data; and graphically render the formatted data and relational links in a plurality of interactive levels.

In one embodiment, the requestor may include a user or an API client.

In one embodiment, the dynamic visualization application may access data with entitlement restrictions in the one or more systems of record or the data cache using at least one credential for the user or the API client.

In one embodiment, the query may include at least of an application name, an application ID, an IP address, a server name, and a physical equipment location.

In one embodiment, the dynamic visualization application may determine a type of property of the query using pattern matching.

In one embodiment, each of system of record or data cache may be associated with a plug-in, and the plug-in formats the data received from the respective one or more system of record or data cache.

In one embodiment, the dynamic visualization application periodically may query the one or more systems of record for information about a plurality of applications and a plurality of infrastructure components and updates the data cache with results of the periodic query.

In one embodiment, the data may include at least one of metrics, status information, and connectivity information.

In one embodiment, the formatted data and relational links in a plurality of interactive levels may be graphically rendered with data retrieved from a drawing repository.

In one embodiment, the dynamic visualization application may identify the one or more systems of record or the data cache that hold data about the application or infrastructure components within the infrastructure. The identification may be based on at least one data definition in a data registry for each system of record.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIGS. 5A-1 to 5C-2 depict three illustrative visualization levels according to one embodiment.

DETAILED DESCRIPTION OF PREFERRED EMBODIMENTS

Exemplary embodiments will now be described in order to illustrate various features. The embodiments described herein are not intended to be limiting, but rather are intended to provide examples of the components, use, and operation of the invention.

Figure 1:
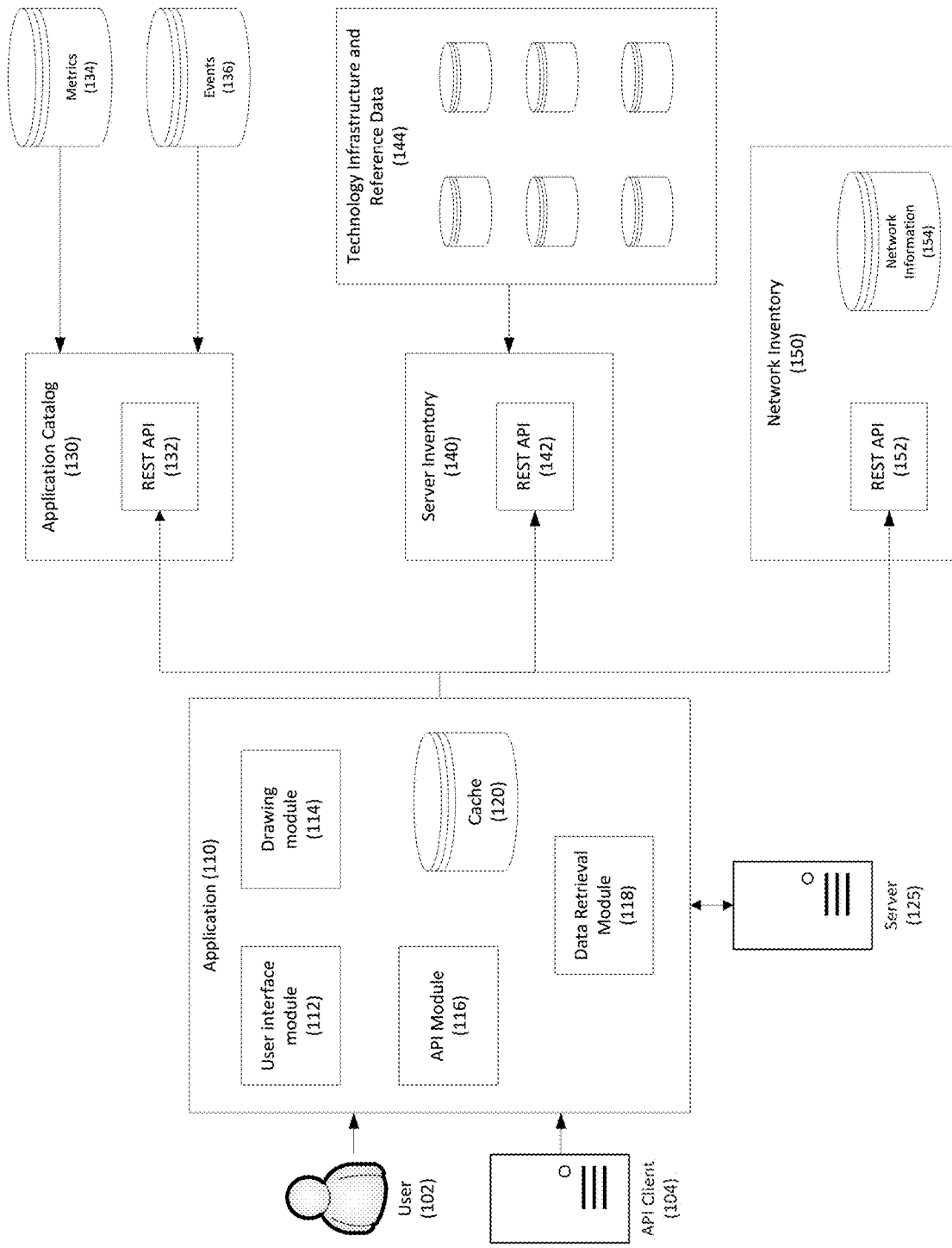
FIG. 1 is an overview diagram of an exemplary application architecture for dynamic visualization of application and infrastructure components according to one embodiment.

FIG. 1 depicts an exemplary architecture for dynamic visualization of application and infrastructure components according to one embodiment. User 102 or API client 104 may access application 110 to query various systems of record 130, 140, and 150, and may view the data therein.

Application 110 may include User Interface (UI) module 112, drawing module 114, API module 116, data retrieval module 118, and data cache component 120. In one embodiment, application 110 may be executed by server 125, which may be a centralized server, a cloud-based server, etc. UI module 112 may provide a user interface to allow users to operate and/or interface with application 110. API module 116 may provide one or more APIs to interface with application 110 to be used by UI module 112 and/or by an API client 104.

API module 116 may call upon data retrieval module 118 to query systems of record 130, 140, 150 for current application and infrastructure component data, or other kinds of data. Data retrieval module 116 may query systems of record 130, 140, 150, format the data received in response, identify relational links within the data, and return the formatted data and relational links back to API module 116. API module 116 may then report the data back to user 102 and/or API client 1104.

API module 116 may also output the data to drawing module 114 in order to render a data visualization of the application and infrastructure component data.

In one embodiment, data retrieval module 118 may store previously retrieved systems of record data in data cache 120. Data retrieval module 118 may, in response to a query from API module 116, first check whether the data has been cached in data cache 120, and whether the cached data has expired, before retrieving the data. If the queried data is cached and not expired, data retrieval module 118 may send a copy of the cached data to API module 116, thus saving time and computing resources by not having to re-query systems of record 130, 140, 150.

In one embodiment, data retrieval module 118 may query systems of record 130, 140, 160 according to a predefined schedule in order to keep the data in data cache component 120 current.

Systems of record may include, for example, Application Catalog 130, Server Inventory 140, and Network Inventory 150. Each system of record 130, 140, 150 may use representational state transfer (REST) API 132, 142, 152. Application catalog may further include network information 134, such as metrics, and event information 136. Server inventory 140 may further receive technology infrastructure and reference data 144. And network inventory 150 may further include network information 145.

In one embodiment, graphical information that may be used in generating a graphical representation of the applications, servers, network, etc. may be provided in one or more drawing repository (not shown). In one embodiment, drawing repositories may be provided within or for one or more of drawing module 114, application catalog 130, server inventory 140, network inventory 150, etc. In one embodiment, each server within the network may maintain a drawing repository, or maybe associated with one or more drawing repositories.

Figure 2:
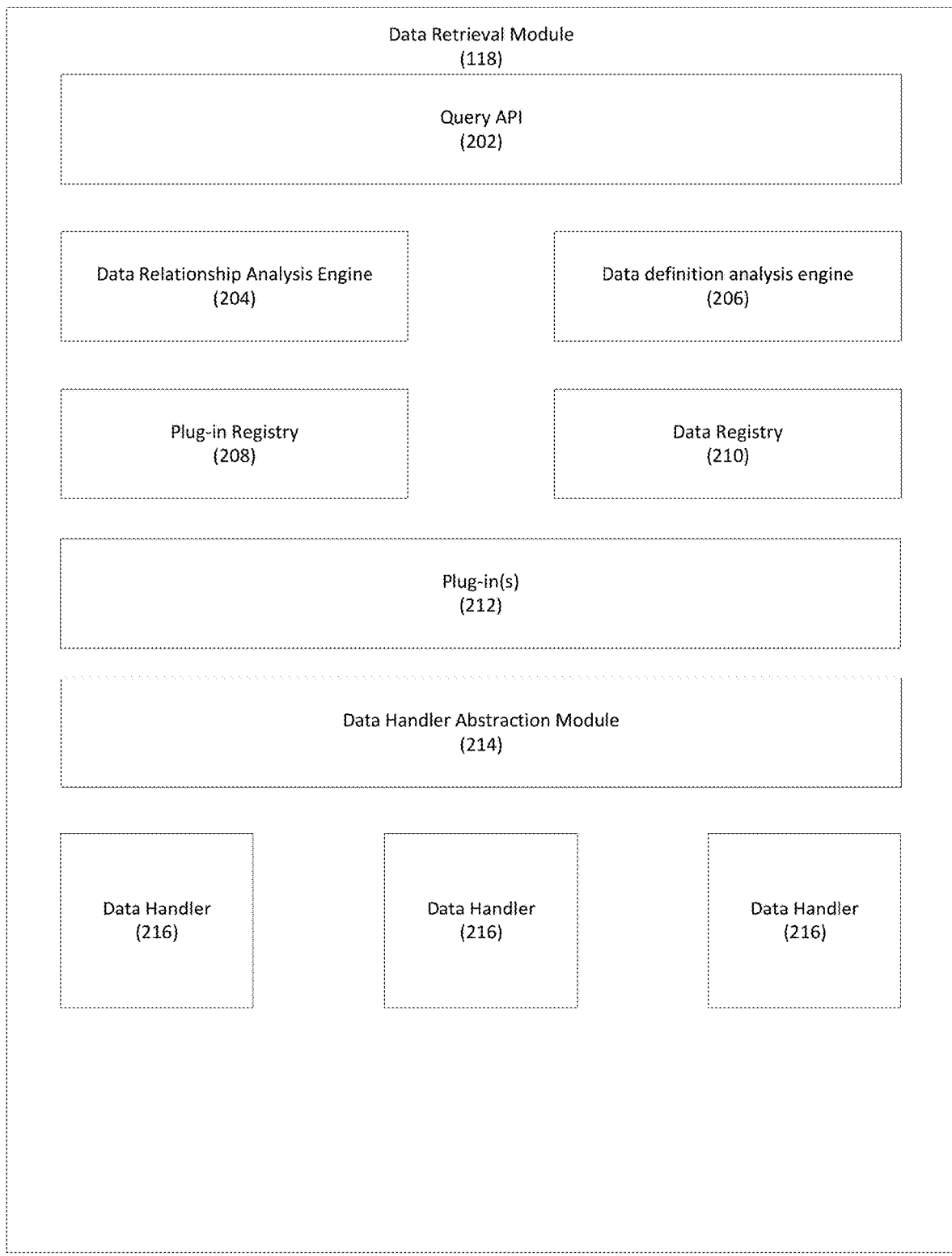
FIG. 2 is an overview diagram of an exemplary system for a data retrieval module according to one embodiment.

FIG. 2 depicts an exemplary embodiment of data retrieval module 118. Data retrieval module 118 may include query API 202, data relationship analysis engine 204, data definition analysis engine 206, plug-in registry 208, data registry 210, one or more plug-ins 212, data handler abstraction module 214, and data handlers 216. The use of multiple, lightweight plug-ins in data retrieval module 118 may allow an application to access various different data sources and systems of record 130, 140, 150 while also providing a modular, easily modifiable plug-in that can be updated as the systems of record 130, 140, 150 change.

Query API 202 may be the interface and integration point for any other application components to access data in a standardized manner. Query API 118 may handle, for example, incoming requests from API module 116 in FIG. 1. In one embodiment, requests may be for information about an application or infrastructure. Requests for other kinds of information may be processed according to different embodiments as necessary and/or desired.

Data relationship analysis engine 204 may evaluate the data collected in order to identify any relational link. Data and information from systems of record 130, 140, 150 may identify an application in a unique manner. Data relationship analysis engine 204 may leverage plug-in information, data definition analysis engine 206, and data registry 210 to determine how information is related.

Data definition analysis engine 204 may identify whether the data needs to be retrieved from a cache, such as data cache 120 in FIG. 1, or from a plug-in.

Plug-in registry 208 may track the installed plug-ins and their associated data. Plug-in registry 208 may be used to route requests based on a query from higher level functions.

Data registry 210 may evaluate the data collected to identify any relational link. In one embodiment, data registry 210 may be part of data relationship analysis engine 204.

Plug-in(s) 212 may sit above data handler module(s) 216 to be lightweight and may leverage the authentication and data retrieval logic of other modules. Plug-in(s) 212 may include functionality, such as interpreting and formatting incoming data. Because systems of record 130, 140, 150 may change over time, the functionality of plug-in(s) 212 may need to be modified as the information from systems of record 130, 140, 150 changes.

In one embodiment, plug-in(s) 212 may be in XML format, JSON format, XACML format, and/or in a package of code files; other formats may be used as is necessary and/or desired.

Data handler abstraction module 214 may operate with data handlers 216. Data handler abstraction module 214 may include a data handler 216 for each data format, for example JSON, XML, database-specific formats, etc. Data handler abstraction module 214 may be provided for cached and plug-in data access.

In one embodiment, data retrieval module 118 may advantageously allow an application to retrieve, reformat, cache, and interpret data of different formats from multiple different systems of record 130, 140, 150. For example, a different, lightweight plug-in 212 may be employed for each system of record 130, 140, 150, which may reformat the incoming data according to a data definition, and may identify data relations in the standardized, reformatted data, etc.

Figure 3:
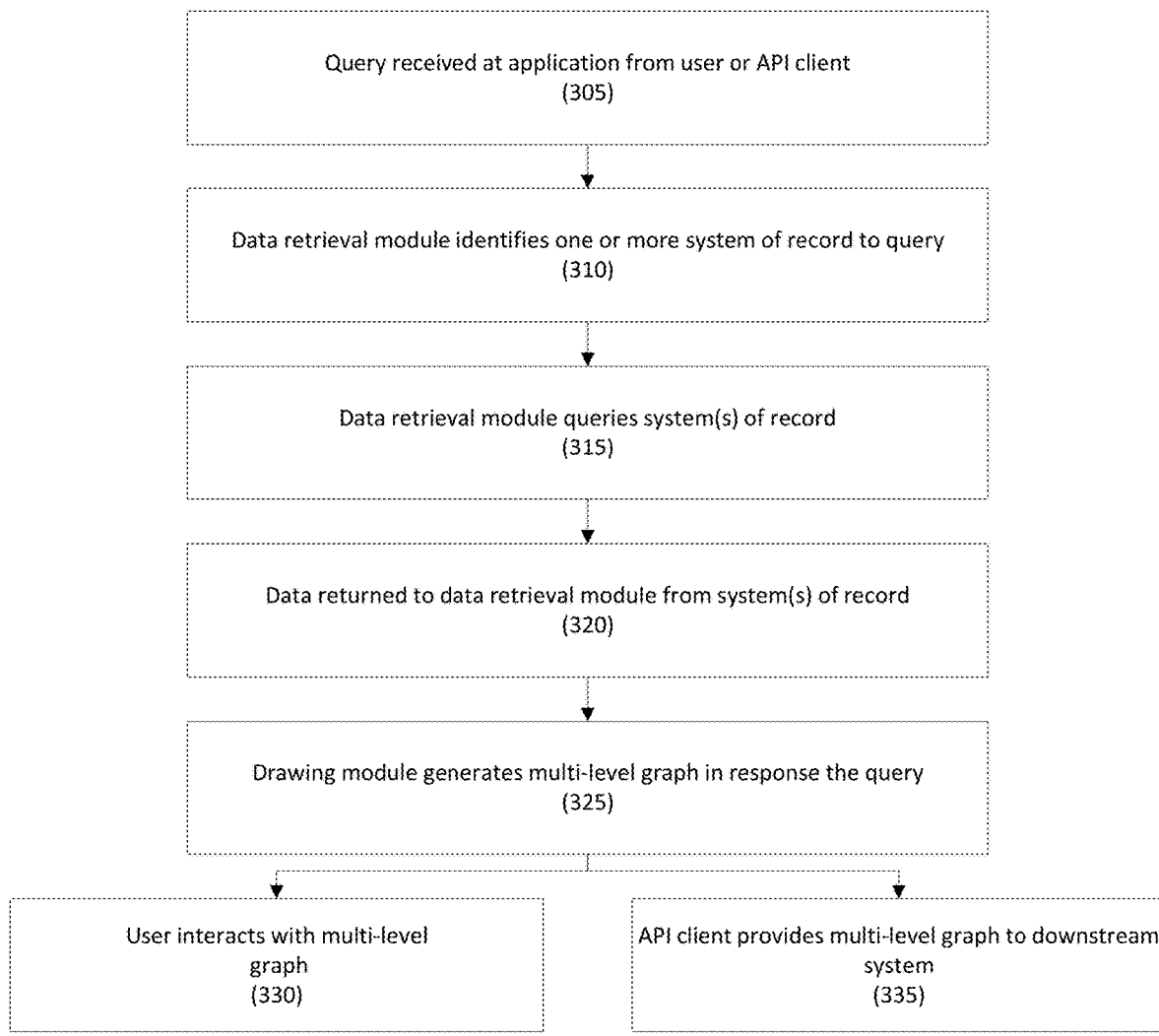
FIG. 3 is an overview diagram of the visualization layers in an exemplary system for dynamic visualization of application and infrastructure components with layers according to one embodiment.

FIG. 3 depicts a method for dynamic visualization of application and infrastructure components with layers according to one embodiment.

In step 305, an application executed by a server, in the cloud, etc. may receive a query from a user or an API client. In one embodiment, the query may request information on an application, infrastructure, a component within the application, etc. Any suitable information may be requested. Examples include metrics, status, connectivity, etc.

In one embodiment, the query may be a value that represents a property of the application, infrastructure, or activity of interest. Examples of properties that may be used to query include the application name, application ID, an IP address or range of addresses, a server name, a physical equipment location, etc.

In one embodiment, pattern recognition may be used to determine whether the property being passed is an IP address, application name, etc. Pattern recognition may be achieved by providing values from the systems of record to a machine-learning process. For example, a data definition analysis engine may receive the data and may establish models or patterns for the data in each field. The models or patterns may be used to inform the query process as to which property the user or API call is providing.

In one embodiment, a data registry may contain the schema definition for each system of record, and this may be used as part of the information fed into the machine learning to establish the pattern recognition.

In step 310, a data retrieval module within the application may identify one or more systems of record that may hold information relevant to the query. For example, based on the machine learning process, and the data definitions in the data registry, the systems of record that have data on the property in the query may be identified.

In step 315, the data retrieval module may query the identified systems of record, and in step 320, the systems of record may respond to the query and may provide responsive data to the data retrieval module. For example, each system of record may be queried for information, and the information may be collected and passed to, for example, the data relationship analysis engine. If the data is from a single source, in step 325, the data may be provided to a drawing module to generate a multi-level graph.

In one embodiment, the data returned from each system of record may be in a different format. Thus, a plug-in may be provided for each system of record, and may define how each system of record is queried. In one embodiment, the plug-in may provide information, such as where the service endpoint is, what type of connection it is (e.g., a type of web service API, database connection, etc.), how to retrieve a list of methods and their definitions, and, in the case of databases it will provide details on what stored procedures exist and how they should be used to query a database.

In one embodiment, a data handler and abstraction module may provide connection and query capability will exist for each connection type supported. It may select one or more appropriate plug-ins to use based on identified systems of record identified, for example, by the data definition analysis engine during the user/API query, and may leverage the information on connections and queries provided by the plug-in to determine what logic to invoke to establish the connection to the systems of record and query the data using the attributes provided in the query.

In step 325, a drawing module within the application may generate a graphical representation in response to the query. In one embodiment, the graphical representation may comprise a plurality of levels, and each level may provide a different amount of detail. For example, the lowest level may provide a visualization of components, and the highest level may provide a visualization of an organization's infrastructure. The number of levels may be determined as is necessary and/or desired.

In one embodiment, a data relationship analysis engine may be used when more than one system of record is queried, or if multi-layered datasets are returned and where the data registry does not have a schema definition that provides a relationship between the data. Once the relationship of the data has been established the dataset may be passed through another machine learning module to identify the principle or root entity that the visualization should be built around. The model established by the machine learning will be trained to identify the entity, within the dataset provided, with the most explicit and implicit references to it as the root entity.

Once the machine learning has identified the root entity, the drawing module may be invoked which, using a classification system to determine how to draw various root entity types, may establish an infrastructure diagram based on that root entity. Attributes/values within the dataset may be weighted to determine at what layer of the visualization they are drawn. In one embodiment, the weighting may be based on the explicit number of connections the attribute has and/or by training a machine learning model to identify the weight based on the attribute provided in the query and/or the layer(s) that will be visualized.

In step 330, the user may interact with the multi-level graph. For example, the user may "zoom" in and out of the layers, may select a component depicted in one layer may be visually presented with additional information on that component, etc.

As an illustration, the "zooming" feature may leverage the center of the center of the screen (plus/minus a certain area around the center, or may determine what to focus on with lower level detail as the user scrolls in. Conversely, as the user scrolls out, embodiments may expand the view to a wider and wider scope. For instance, a user may search for a piece of equipment, and this may display multiple hosts running on that piece of equipment along with any physical connections to other equipment. As the user roughly centers the drawing on a particular host and zooms in on a particular element, the view may show the applications running on that host along with their logical connections to other applications and hardware, roughly centering the drawing on one of the applications. Zooming in further begins to show the components of the application and the flow of information between them.

In embodiments, because one or more data sources may be queried for data as the user zooms in/out, embodiments may provide, for example, live health views, alerts, capacity risks, and other relevant information associated with the operational state of applications and infrastructure. In one embodiment, the information may be provided in a dashboard.

In step 335, the API client may provide the data to a calling application or downstream system based on the query that was passed for the downstream system to process.

In one embodiment, the API may provide a graphical return of the information to the calling application or downstream system.

Figure 4:
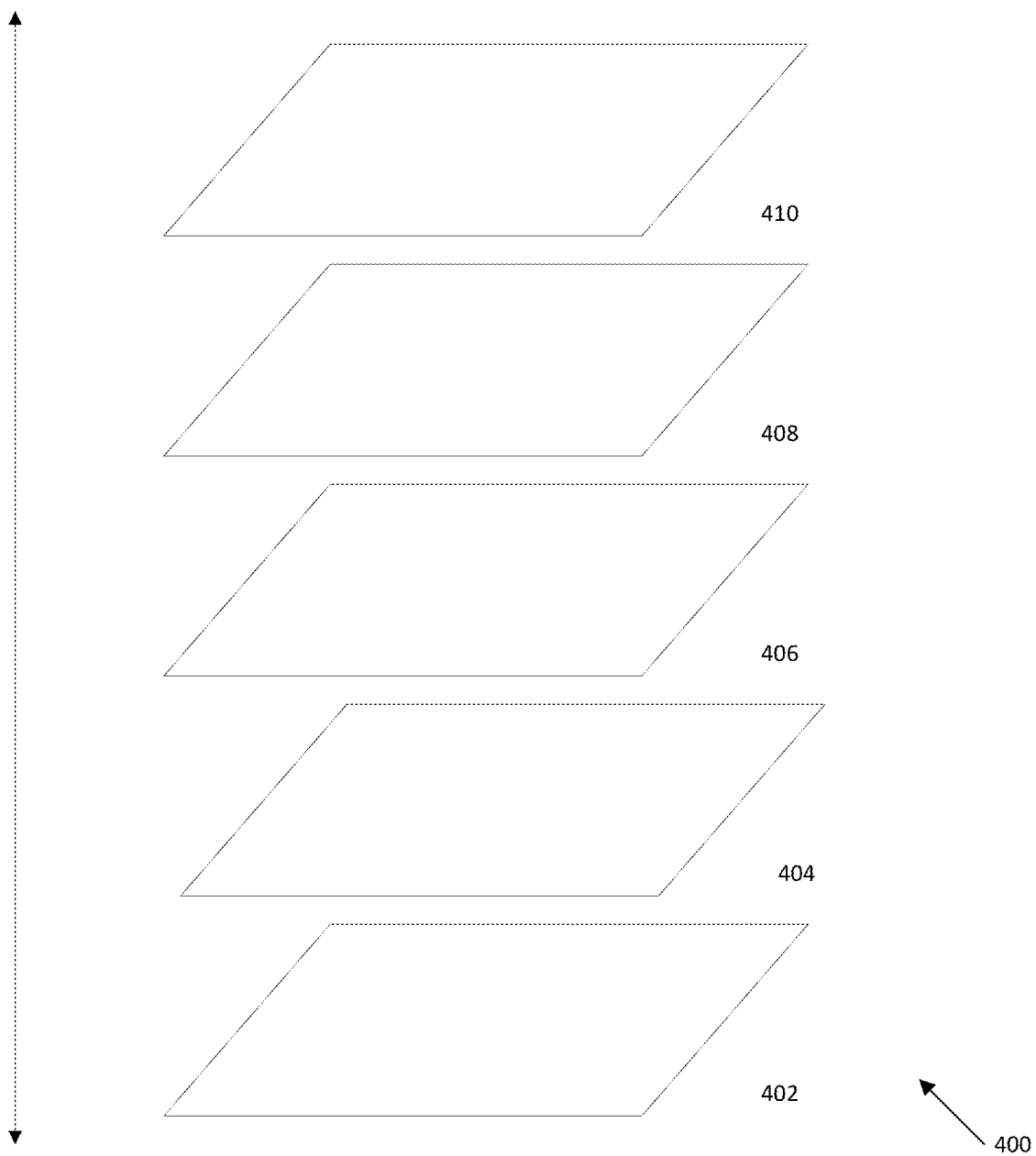
FIG. 4 depicts an exemplary illustration of visualization levels in according to one embodiment.

FIG. 4 provides an illustrative diagram of the visualization levels in according to one embodiment. Expanded view 400 illustrates a plurality of levels 402, 404, 406, 408, and 410. Although five levels are depicted in FIG. 4, it should be recognized that the number of levels may be selected as is necessary and/or desired.

Each level 402, 404, 406, 408, 410, may represent a "level of detail," or visualization level, to be rendered by, for example, drawing module 114 of FIG. 1. At each level 402, 404, 406, 408, 410, a particular level of detail is shown in the infrastructure. As an illustrative example, at level 406, the visualization level may be, for example, a view of a single application, and may include information such as the running performance metrics of the application. Level 404, which is one level of detail lower, may depict all of the components that comprise that particular application. Level 402, which is another level of detail lower, may depict an individual software or infrastructure component.

Level 408, which is a higher visualization level than level 406, may depict for example, the inside of the data center where the application resides. This may include, for example, the health of the data center in which the application exists.

Level 410 may depict, for example, other instances of the application across the whole infrastructure, including all the data centers in which these instances exists.

In addition to levels of detail, embodiments may also provide visualization layer options in visualizing the data. For example, a user or API client may turn on or off different "layers" to look at the kinds of data relevant to the analysis. A user/API client may turn on "change information" (changes made to an application or component) and "outage information" (information about outages) but turn off other layers of data (such as disk usage). In this example, the user/API client may easily see how an outage might have been affected by changes to one or more applications, components, networks, data centers, etc.

In one embodiment, visualization layers may be used in combination with visualization levels in the drawing module.

In one embodiment, any queries against the systems of record may be leveraged using the user's credentials. For example, there may be entitlement restrictions in the infrastructure, where only certain users or API clients can see certain applications or data. Thus, the user's credentials may be used to authorize the user's query before querying application and infrastructure component information.

In one embodiment, where a user does not have access to a certain information, for example, due to entitlement restrictions, a placeholder may be displayed as a part of the rendered visualization, including an explanation that the information is unavailable and the reason why that information is not displayed.

Embodiments may provide some or all of the following advantages and improvements: they may increase business efficiency (e.g., fewer man hours required to collect, compile, analyze, and maintain documentation); improve accuracy of documentation (e.g., better visualization and error checking, more up-to-date documentation); facilitate better decision-making (e.g., triage of information at multiple levels of detail and with varied layers); and improve data security (e.g., authentication based on user credentials), etc. These advantages may be achieved according to the embodiments without displacing any existing systems of record, information portals, or processes.

Figures 1, 5A:
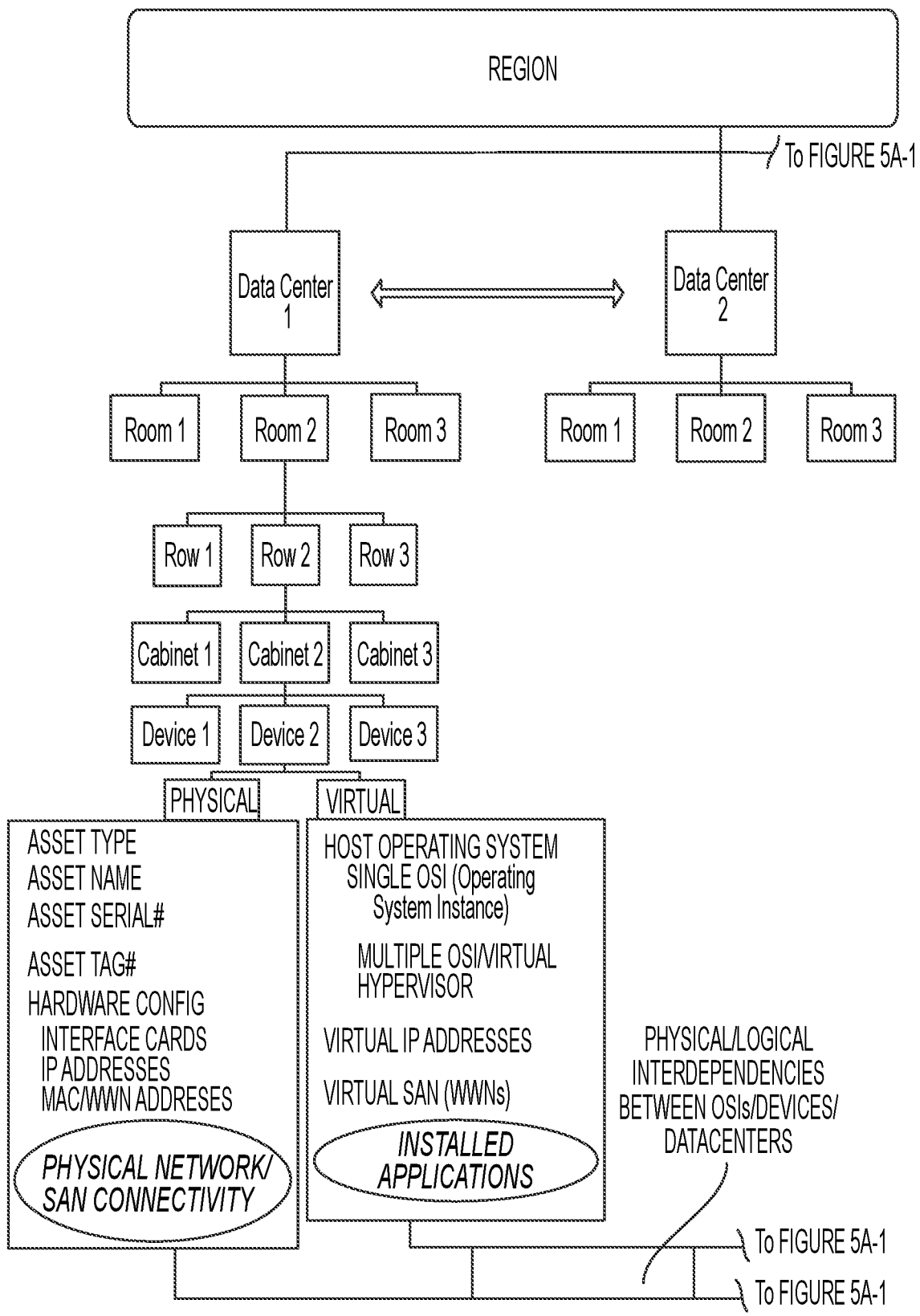
Figures 2, 5A:
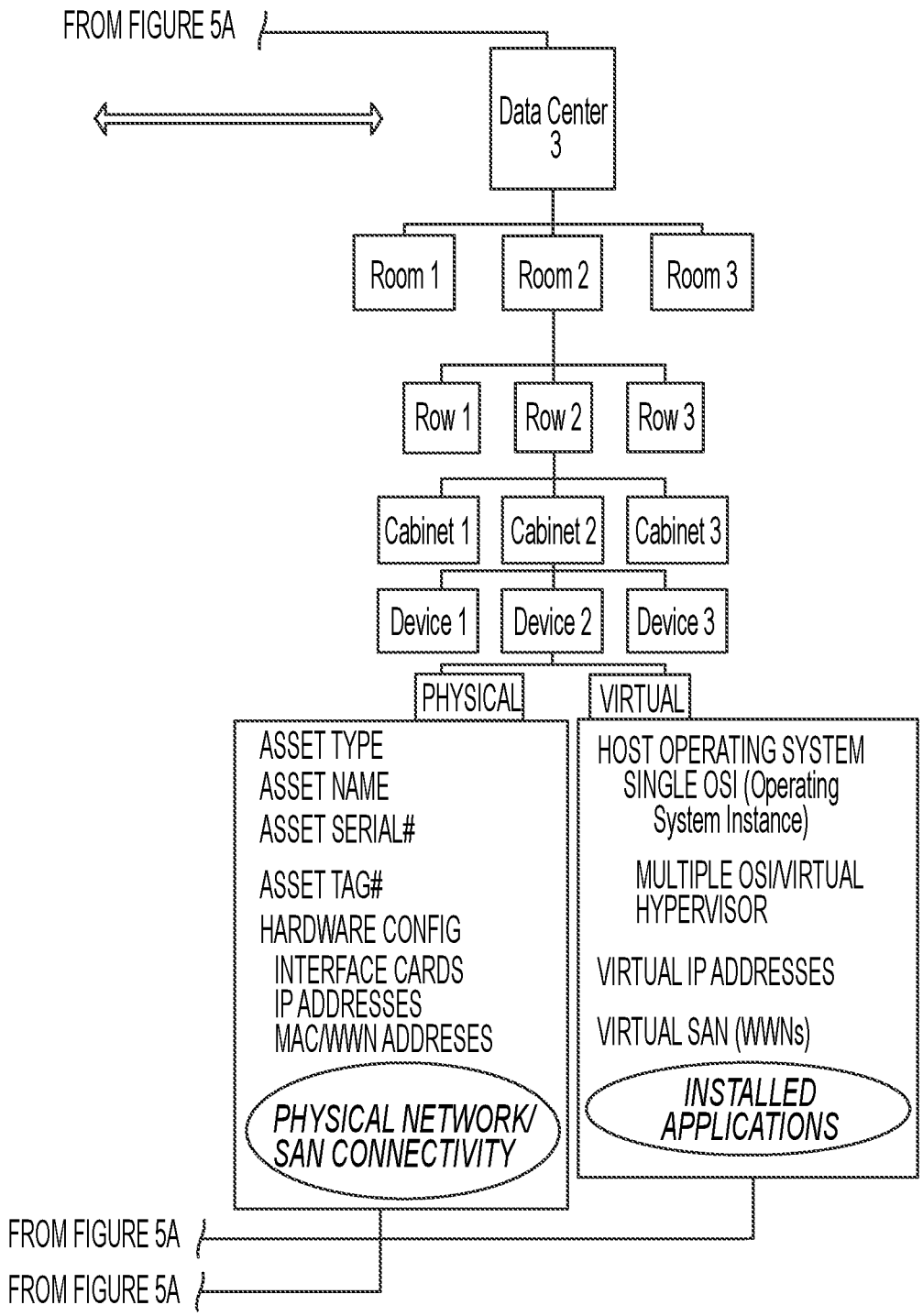

FIGS. 5A-1 to 5A-2, 5B-1 to 5B-3, and 5C-1 to 5C-2 are exemplary depictions of three visualization levels. For example, FIGS. 5A-1 to 5A-2 may depict a visualization at level at a second level within an organization, and depicts a region, the data centers in that region, the rooms within the data centers, etc. FIGS. 5A-1 to 5A-2 may depict a higher or lower visualization within the organization.

Figures 1, 5B:
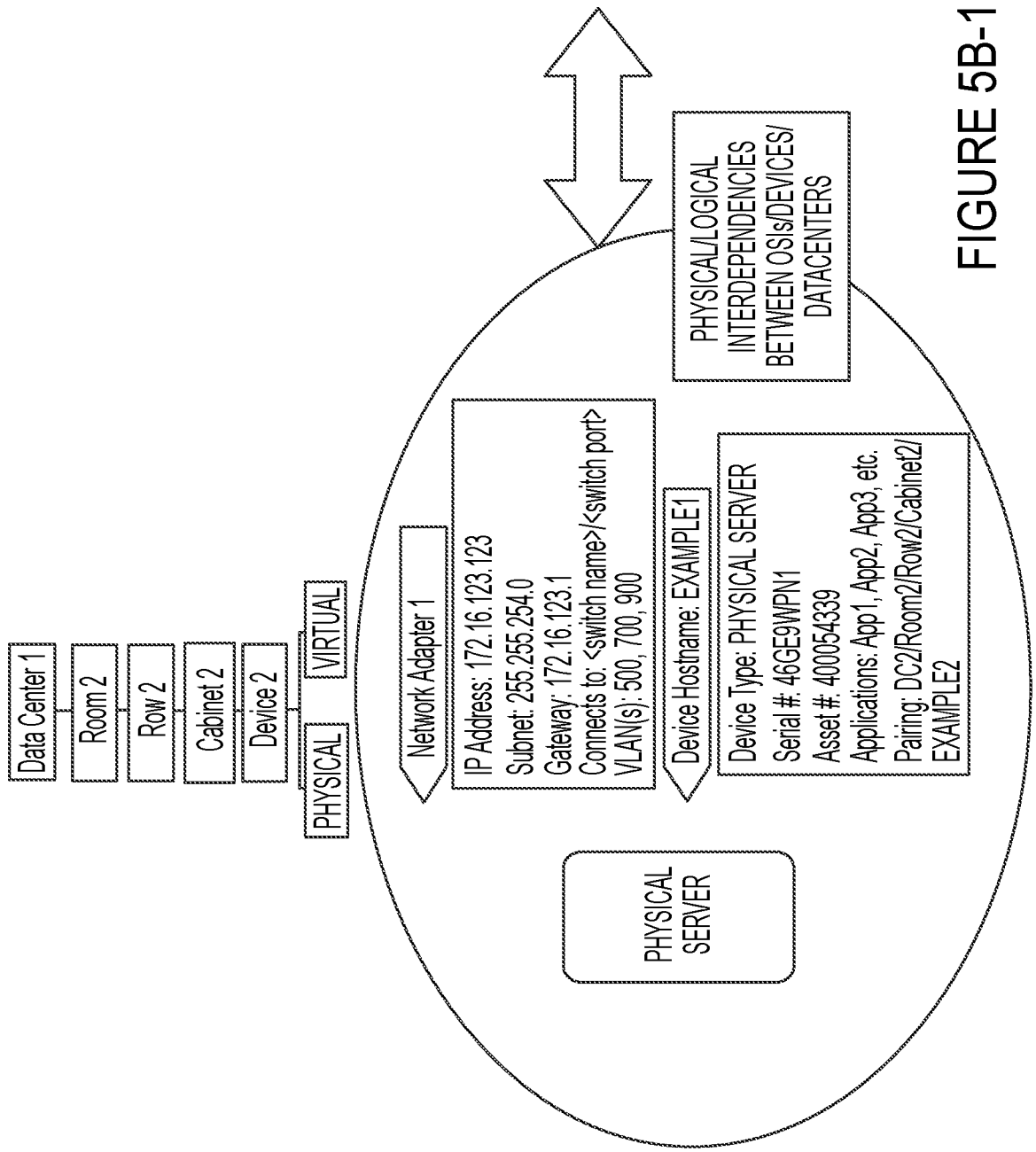
Figures 2, 5B:
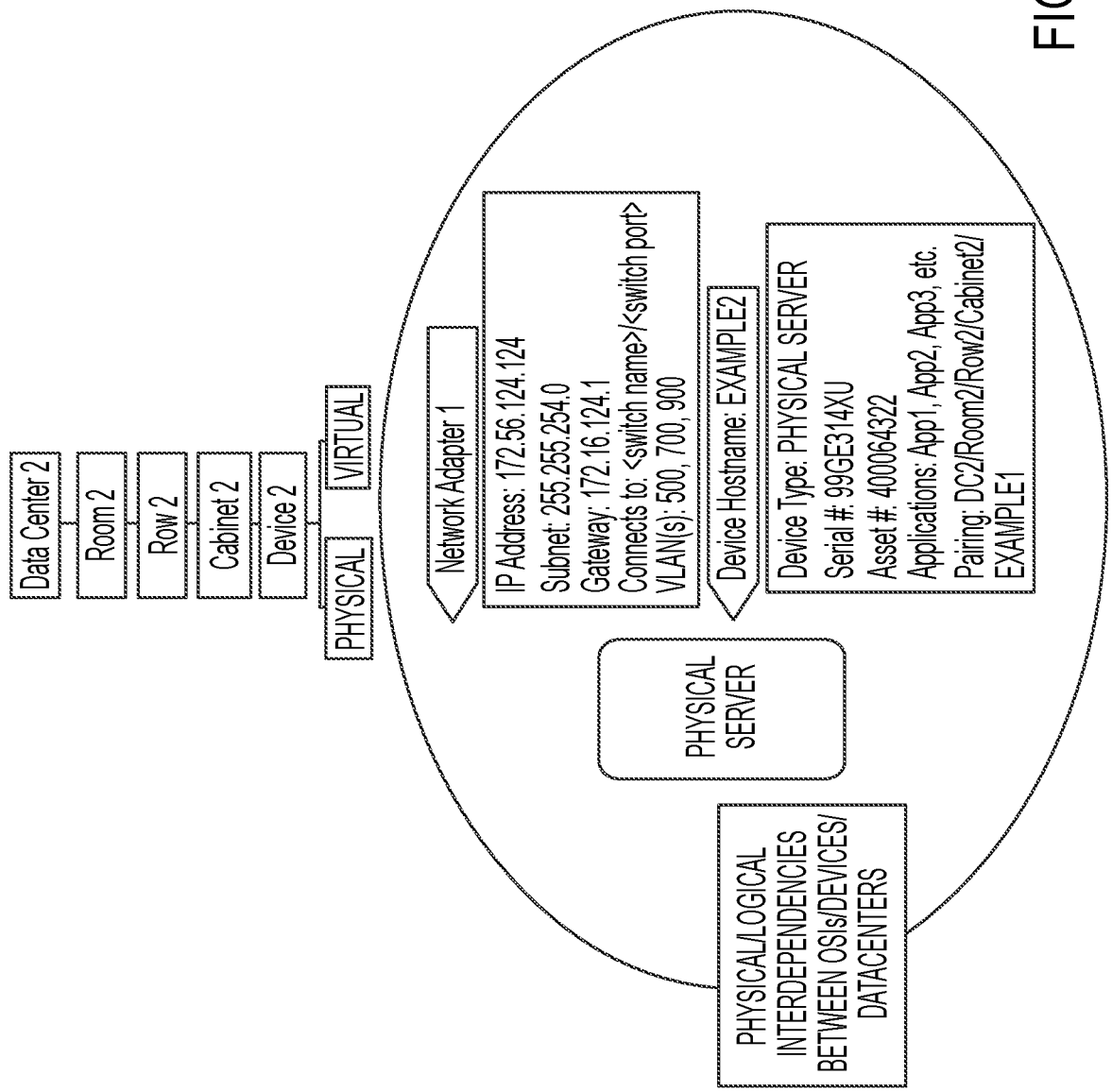
Figures 3, 5B:
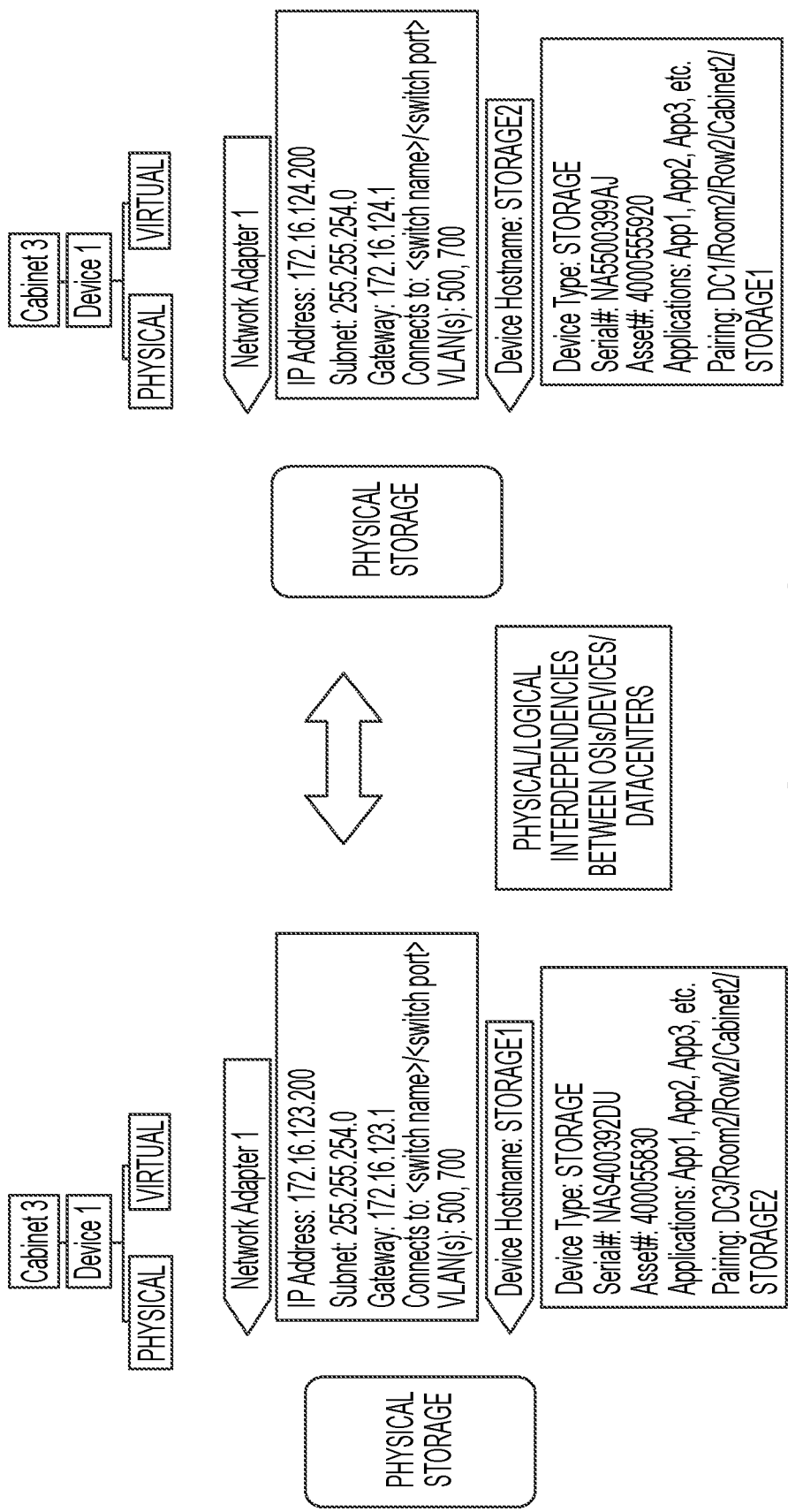

If the user were to select or otherwise indicate a desire to learn more about Data Center 1, Room 2, Row 2, Cabinet 2, Device 2, the user may be presented with FIGS. 5B-1 to 5B-3, which provide additional information about this device, including its physical/logical interdependencies with Data Center 2, Room 2, Row 2, Cabinet 2, Device 2. FIGS. 5B-1 to 5B-3 thus depict the next visualization level following FIG. 5A.

Other devices in FIGS. 5A-1 to 5A-2 may be selected as well.

Figures 1, 5C:
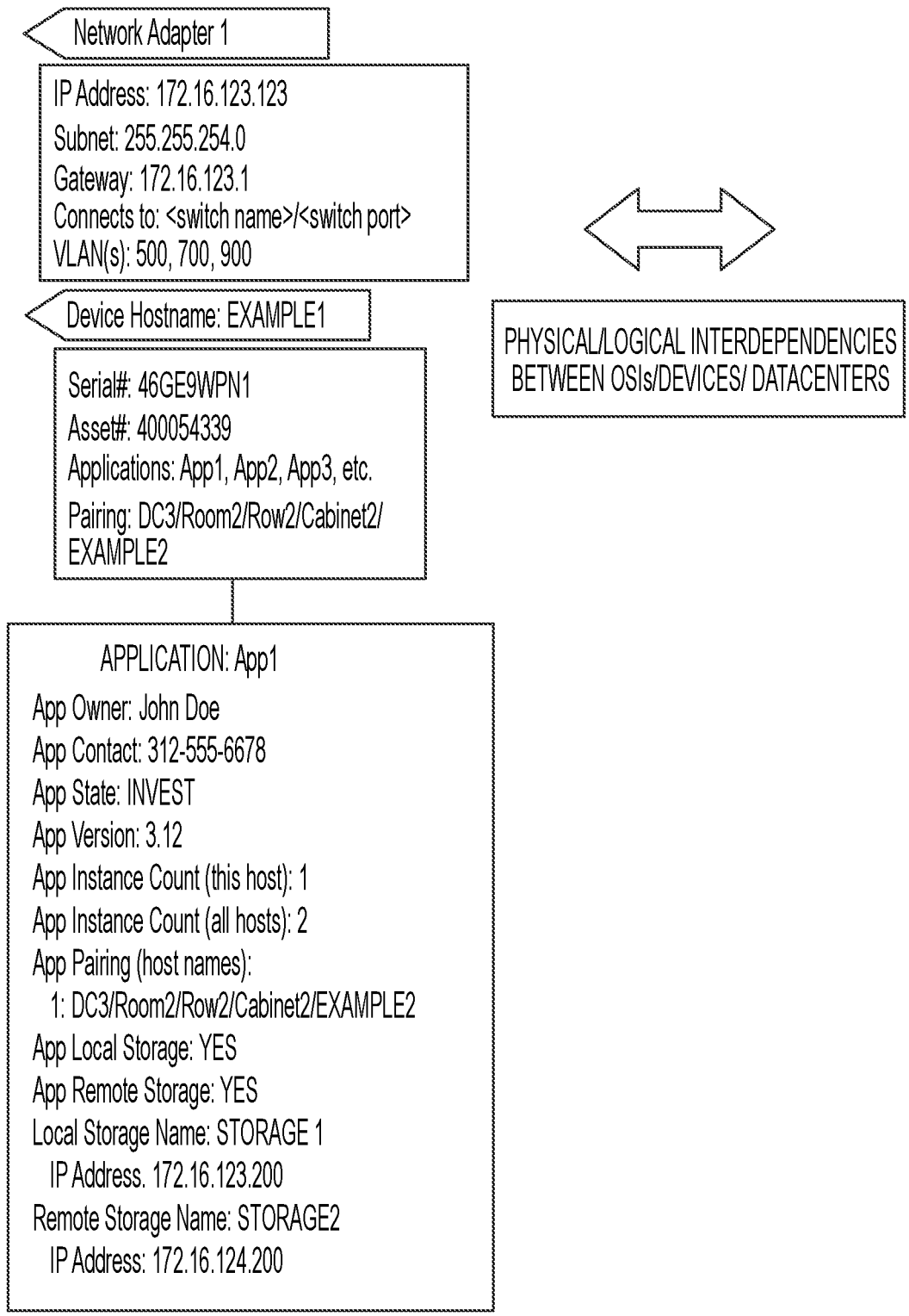
Figures 2, 5C:
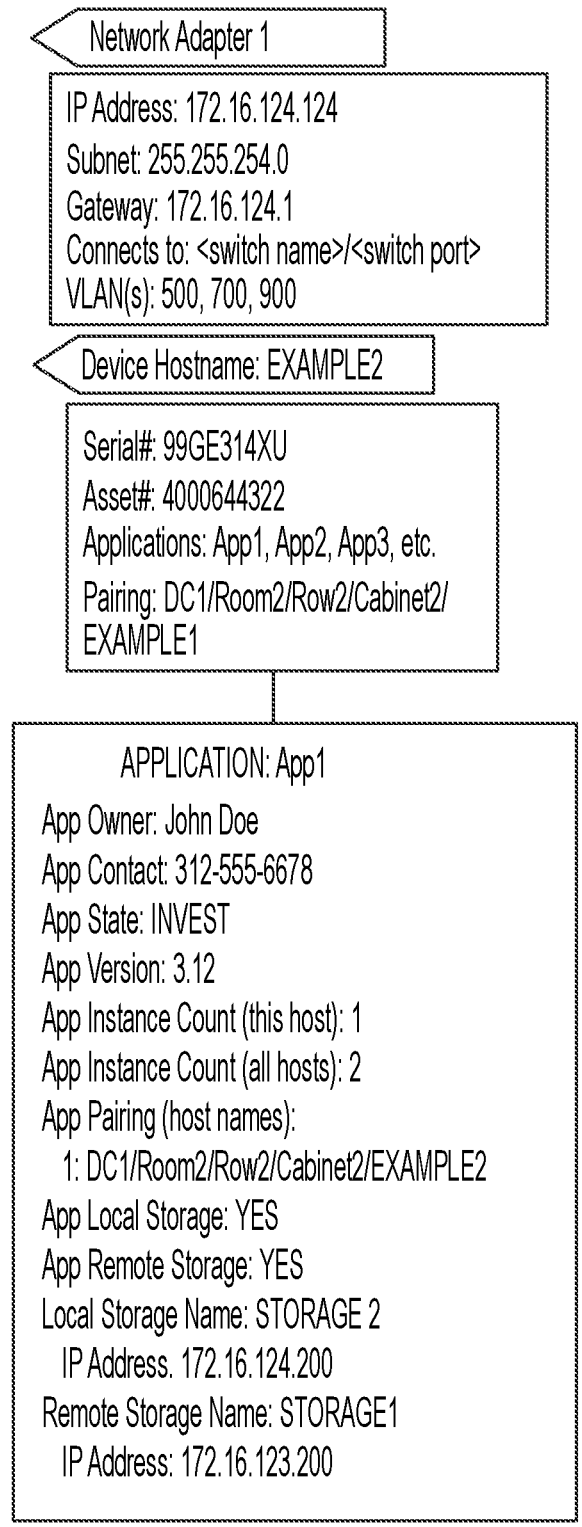

Selecting the application interdependency may return FIGS. 5C-1 to 5C-2, which provide additional details on the interdependencies between these devices. FIGS. 5C-1 to 5C-2 thus depict the next visualization level following FIGS. 5B-1 to 5B-3.

Hereinafter, general aspects of implementation of the systems and methods of the embodiments will be described.

The system of the embodiments or portions of the system of the embodiments may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for providing dynamic visualization of application and infrastructure components, comprising:
   in an information processing apparatus comprising at least one computer processor:
   receiving, at an interface and from a requestor, a request for a computing infrastructure for an organization;
   querying one or more systems of record or a data cache containing data from the one or more systems of record for data about a plurality of applications or a plurality of computing infrastructure components within the computing infrastructure;
   periodically querying the one or more systems of record for information about the plurality of computing infrastructure components;
   updating the data cache with results of the periodic query;

formatting the data received from the one or more systems of record or the data cache according to a data definition;

identifying relational links between the computing infrastructure components in the formatted data; and graphically rendering the computing infrastructure by rendering the computer infrastructure components, the formatted data, and the relational links in a plurality of interactive levels.

2. The method of claim 1, wherein the requestor comprises a user or an API client.

3. The method of claim 2, further comprising:

accessing data with entitlement restrictions in the one or more systems of record or the data cache using at least one credential for the user or the API client.

4. The method of claim 1, wherein the query comprises at least of an application name, an application ID, an IP address, a server name, and a physical equipment location.

5. The method of claim 4, further comprising:

determining a type of property of the query using pattern matching.

6. The method of claim 1, wherein each of system of record or data cache is associated with a plug-in, and the plug-in formats the data received from the respective one or more system of record or data cache.

7. The method of claim 1, wherein the data comprises at least one of metrics, status information, and connectivity information.

8. The method of claim 1, wherein the formatted data and relational links in a plurality of interactive levels are graphically rendered with data retrieved from a drawing repository.

9. A method for providing dynamic visualization of application and infrastructure components, comprising:

in an information processing apparatus comprising at least one computer processor:

receiving, at an interface and from a requestor, a request for a computing infrastructure for an organization;

identifying one or more systems of record or a data cache that hold data about the computing infrastructure components within the computing infrastructure, wherein the identification is based on at least one data definition in a data registry for each system of record;

querying the one or more systems of record or the data cache containing data from the one or more systems of record for data about a plurality of applications or a plurality of computing infrastructure components within the computing infrastructure;

formatting the data received from the one or more systems of record or the data cache according to a data definition;

identifying relational links between the computing infrastructure components in the formatted data; and graphically rendering the computing infrastructure by rendering the computer infrastructure components, the formatted data, and the relational links in a plurality of interactive levels.

10. A system for providing dynamic visualization of application and infrastructure components, comprising:

an interface configured to interface with a user or an API client;

a dynamic visualization application executed by a server;

a plurality of systems of record, each system of record comprising information about a plurality of applications or a plurality of infrastructure components; and a data cache comprising cached information about the plurality of applications or the plurality of infrastructure components;

wherein:

the interface receives from a requestor a request for a computing infrastructure for an organization;

the dynamic visualization application queries one or more of the systems of record or the data cache for data about the computing infrastructure components within the computing infrastructure;

the dynamic visualization application periodically queries the one or more systems of record for information about the computing infrastructure components and updates the data cache with results of the periodic query;

the dynamic visualization application formats the data received from the one or more systems of record or the data cache according to a data definition;

the dynamic visualization application identifies relational links between the applications and the computing infrastructure components in the formatted data; and the dynamic visualization application graphically renders the computing infrastructure by rendering the computer infrastructure components, the formatted data, and the relational links in a plurality of interactive levels.

11. The system of claim 10, wherein the requestor comprises a user or an API client.

12. The system of claim 11, wherein the dynamic visualization application accesses data with entitlement restrictions in the one or more systems of record or the data cache using at least one credential for the user or the API client.

13. The system of claim 10, wherein the query comprises at least of an application name, an application ID, an IP address, a server name, and a physical equipment location.

14. The system of claim 13, wherein the dynamic visualization application determines a type of property of the query using pattern matching.

15. The system of claim 10, wherein each of system of record or data cache is associated with a plug-in, and the plug-in formats the data received from the respective one or more system of record or data cache.

16. The system of claim 10, wherein the data comprises at least one of metrics, status information, and connectivity information.

17. The system of claim 10, wherein the formatted data and relational links in a plurality of interactive levels are graphically rendered with data retrieved from a drawing repository.

18. The system of claim 10, wherein the dynamic visualization application identifies the one or more systems of record or the data cache that hold data about the computing infrastructure components within the computing infrastructure;

wherein the identification is based on at least one data definition in a data registry for each system of record.

19. A system for providing dynamic visualization of application and infrastructure components, comprising:

an interface configured to interface with a user or an API client;

a dynamic visualization application executed by a server;

a plurality of systems of record, each system of record comprising information about a plurality of applications or a plurality of infrastructure components; and a data cache comprising cached information about the plurality of applications or the plurality of infrastructure components;

wherein:

the interface receives from a requestor a request for a computing infrastructure for an organization;

the dynamic visualization application identifies the one or more systems of record or the data cache that hold data about the plurality of computing infrastructure components within the computing infrastructure, wherein the identification is based on at least one data definition in a data registry for each system of record;

the dynamic visualization application queries one or more of the systems of record or the data cache for data about the computing infrastructure components within the computing infrastructure;

the dynamic visualization application formats the data received from the one or more systems of record or the data cache according to a data definition;

the dynamic visualization application identifies relational links between the applications and the computing infrastructure components in the formatted data; and the dynamic visualization application graphically renders the computing infrastructure by rendering the computer infrastructure components, the formatted data, and the relational links in a plurality of interactive levels.

* * * * *